(12) United States Patent
Qian et al.

(10) Patent No.: US 11,647,099 B2
(45) Date of Patent: May 9, 2023

(54) METHOD AND APPARATUS FOR TRANSMITTING DATA IN IOT SYSTEM, AND GATEWAY DEVICE AND STORAGE MEDIUM THEREOF

(71) Applicants: ENVISION DIGITAL INTERNATIONAL PTE. LTD., Singapore (SG); SHANGHAI ENVISION DIGITAL CO., LTD., Shanghai (CN)

(72) Inventors: Jialin Qian, Shanghai (CN); Changdong Cui, Shanghai (CN); Hongzhen Zhang, Shanghai (CN); Yang Zhang, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

( * ) Notice: Subject to any disclaimer, the term of this patent is extended or adjusted under 35 U.S.C. 154(b) by 0 days.

(21) Appl. No.: 17/775,145

(22) PCT Filed: Nov. 4, 2020

(86) PCT No.: PCT/SG2020/050637
§ 371 (c)(1),
(2) Date: May 6, 2022

(87) PCT Pub. No.: WO2021/091492
PCT Pub. Date: May 14, 2021

(65) Prior Publication Data
US 2022/0353349 A1    Nov. 3, 2022

(30) Foreign Application Priority Data

Nov. 6, 2019 (CN) .......................... 201911076109.2

(51) Int. Cl.
*H04L 67/5682* (2022.01)
*H04L 67/12* (2022.01)

(52) U.S. Cl.
CPC .......... *H04L 67/5682* (2022.05); *H04L 67/12* (2013.01)

(58) Field of Classification Search
CPC ... H04L 67/5682; H04L 67/12; H04L 67/568; H04L 69/40; H04L 12/66; H04L 67/2871;
(Continued)

(56) References Cited

U.S. PATENT DOCUMENTS

| 10,313,221 B1 | 6/2019 | Leonard | |
|---|---|---|---|
| 2017/0105131 A1* | 4/2017 | Song | H04W 4/80 |
| 2018/0285580 A1* | 10/2018 | Chen | G06F 21/316 |

FOREIGN PATENT DOCUMENTS

| JP | 2018142901 A | 9/2018 |
|---|---|---|
| JP | 2019153894 A | 9/2019 |
| JP | 2020010192 A | 1/2020 |

OTHER PUBLICATIONS

Notice of Preliminary Rejection dated Oct. 7, 2022 for Korean Application No. 10-2022-7019018.
(Continued)

*Primary Examiner* — Kim T Nguyen
(74) *Attorney, Agent, or Firm* — JCIP; Joseph G. Chu; Jeremy I. Maynard (57) ABSTRACT

Disclosed are a method and apparatus for transmitting data in an IoT system. The method includes: determining a data type of device data sent by an IoT device when a connection between a gateway device and a server is abnormal; storing device data of a real-time data type into a first message queue of a message-oriented middleware, and storing device data of a historical data type into a second message queue of the message-oriented middleware; transmuting the device data in the first message queue to a server over a first MQTT
(Continued)

channel and transmitting the device data in the second message queue to the server over a second MQTT channel when the connection resumes to a normal state.

10 Claims, 7 Drawing Sheets

(58) Field of Classification Search
CPC ...... H04L 67/562; H04W 4/38; H04W 88/16; H04W 4/70; G16Y 30/00
See application file for complete search history.

(56) References Cited

OTHER PUBLICATIONS

International Search Report and Written Opinion of International Searching Authority dated Feb. 26, 2021 for International Application No. PCT/SG2020/050637.
International Preliminary Report on Patentability dated Feb. 7, 2022 for International Application No. PCT/SG2020/050637.
Luzuriaga J. E., Managing Mobility for Distributed Smart Cities Services. PhD Thesis, May 9, 2017, pp. 1-102 [Retrieved on Jan. 28, 2021] 5.1 Intermediate Buffering proposal, 5.3.2 Using the MQTT protocol with buffering, 6.2.3 Inter-infrastructure Delay, 6.2.4 Inter-message Receiving Delay, 6.2.5 Order Delivery Analysis.
Lampkin V. et al., Building Smarter Planet Solutions with MQTT and IBM WebSphere MQ Telemetry. , Sep. 30, 2012, pp. 1-250 [Retrieved on Jan. 28, 2021] 1.4 MQTT client identifier, 1.5 Durable and non-durable subscribers with MQTT.
Persistent Session and Queuing Messages—MQTT Essentials: Part 7. Feb. 23, 2015 [Retrieved on Jan. 28, 2021 from https://www.hivemq.com/blog/mqtt-essentials-part-7-persistent-session-queuing-messages/] Whole document.
Australian Examination Report No. 1 dated Dec. 14, 2022 for Australian Application No. 2020380107.
Extended European Search Report dated Nov. 7, 2022 for European Application No. 20885386.1.
Notice of Reasons for Refusal dated Dec. 9, 2022 for Japanese Application No. 2022-526522.
Notice of Allowance from Korean Intellectual Property Office dated Dec. 19, 2022 for Korean Application No. 10-2022-7019018.

\* cited by examiner

METHOD AND APPARATUS FOR TRANSMITTING DATA IN IOT SYSTEM, AND GATEWAY DEVICE AND STORAGE MEDIUM THEREOF

TECHNICAL FIELD

The embodiments of the present disclosure relate to the field of Internet of things, and more particularly to a method and apparatus for transmitting data, and a gateway device and a storage medium thereof.

BACKGROUND

An Internet of things (IoT) system is a computer control system that implements information exchange between infrastructure and the Internet by an information acquisition device. A gateway device obtains data acquired by an IoT device at the edge and reports the data to a cloud, and relevant personnel may analyze the data.

In the process of uploading data to the cloud by the gateway device, communication may be interrupted due to a network delay or an infrastructure failure, or the like. In the related art, breakpoint data are usually discarded, or cached to a disk file or a database, and then uploaded to the cloud after the communication is resumed.

However, in the method for processing breakpoint data in the related art, the cached data file generally needs to be manually uploaded to the cloud according to a timestamp. The operation is complicated and time-consuming, and timeliness of data may not be ensured.

SUMMARY

Embodiments of the present disclosure provide a method and apparatus for transmitting data in an IoT system, and a gateway device, and a storage medium thereof. The technical solutions are as follows:

In one aspect, embodiments of the present disclosure provide a method for transmitting data in an IoT system. The method includes:

determining a data type of device data sent by an IoT device when a connection between a gateway device and a server is abnormal, the data type including a real-time data type and a historical data type;

storing the device data of a real-time data type into a first message queue of a message-oriented middleware, and storing the device data of a historical data type into a second message queue of the message-oriented middleware;

transmitting the device data in the first message queue to the server over a first Message Queuing Telemetry Transport (MQTT) channel, and transmitting the device data in the second message queue to the server over a second MQTT channel.

In another aspect, embodiments of the present disclosure provide an apparatus for transmitting data in an IoT system. The apparatus includes:

a first determining module, configured to determine a data type of device data sent by an IoT device when the connection between a gateway device and a server is abnormal, the data type including a real-time data type and a historical data type;

a first storage module, configured to store the device data of a real-time data type to a first message queue of a message-oriented middleware, and the device data of a historical data type to a second message queue of the message-oriented middleware;

a first transmitting module, configured to transmit the device data in the first message queue to the server over a first MQTT channel, and transmit the device data in the second message queue to the server over a second MQTT channel, when the connection between the gateway device and the server resumes to a normal state.

In another aspect, embodiments of the present disclosure provide a gateway device. The gateway device includes a processor and a memory, wherein the memory stores at least one instruction, at least one program, a code set, or an instruction set, wherein the at least one instruction, the at least one program, the code set or the instruction set is loaded and executed by the processor to implement the method for transmitting data in the IoT system as described in the above aspect.

In another aspect, embodiments of the present disclosure provide a computer-readable storage medium. The computer-readable storage medium stores at least one instruction, at least one program, a code set or an instruction set, wherein the at least one instruction, the at least one program, the code set or the instruction set is loaded and executed by the processor to implement the method for transmitting data in the IoT system as described in the above aspect.

The beneficial effects achieved the technical solutions according to the embodiments of the present disclosure include at least:

when the connection between the gateway device and the server is abnormal, the data to be transmitted is divided into real-time data and historical data, and stored in different message queues respectively, such that the device data in the message queues is uploaded to the server over different channels when the connection resumes to a normal state, which improves the timeliness of uploading real-time data while ensuring data integrity, and does not require manual intervention to upload breakpoint data complementally, thereby simplifying the operation steps.

DETAILED DESCRIPTION

The present disclosure is described in further detail hereinafter with reference to the accompanying drawings, to present the objects, technical solutions, and advantages of the present disclosure more clearly.

The term "plurality" herein refers to two or more. The term "and/or" herein describes a corresponding relationship of the corresponding objects, indicating three kinds of relationships. For example, A and/or B, can be expressed as: A exists alone, A and B exist concurrently, B exists alone. The character "/" generally indicates that the context object is an "OR" relationship.

In the related art, in an IoT system, when a connection between a gateway device and a server is abnormal, the gateway device stores received device data to a local cache file, and after the connection resumes to a normal state, the data in a cache file is uploaded to the server complementally through a manual intervention operation. For some instantaneous breakpoint data caused by brief network jitters or other factors, the gateway device usually discards the data directly.

As to supplemental uploading of breakpoint data by the above technology, the former requires the manual intervention operation, and the steps are cumbersome and time-consuming, which may result in loss of service value of the data; if multiple connection abnormalities occur within a certain period of time, the supplemental uploading of device data also needs to import and export data multiple times, and errors may easily occur in manual operation, resulting in overlapping, missing or disordering of time windows; and in the process of data export for supplemental uploading, data needs to be stored in the manner of external storage, which may cause leakage of device data. The latter directly discards the instantaneous breakpoint data, resulting in that integrity of the device data may not be ensured.

Figure 1:
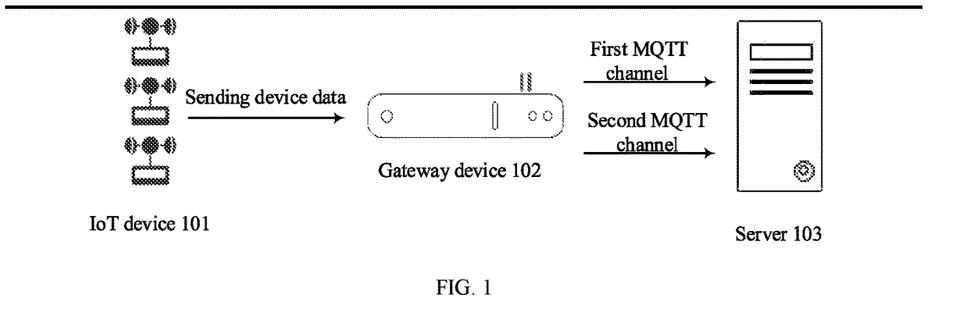
FIG. 1 is a schematic diagram of an implementation environment according to an exemplary embodiment.

In order to solve the above problem, an embodiment of the present disclosure provides a method for transmitting data in an IoT system. Referring to FIG. 1, a schematic diagram of an implementation environment according to an exemplary embodiment of the present disclosure is illustrated. The implementation environment includes an IoT device 101, a gateway device 102, and a server 103.

The IoT device 101 is an information acquisition device in the IoT system, and is mainly configured to acquire data, which is usually provided with a sensor (such as a photovoltaic sensor, a speed sensor, a pressure sensor, or the like) and an actuator (such as a hydraulic actuator, a pulse signal actuator, or the like). The sensor may convert the information acquired by the device into electrical signals or other desired forms of information for output according to a certain rule. The actuator is usually used in an automatic control system to receive control signals from a cloud or other devices, thereby maintaining a controlled amount within a required range. In addition to acquiring and transmitting data, the IoT device also needs to support data processing and storage functions, which are commonly used in the fields of industry, power grid, smart home, intelligent transportation, and the like.

The IoT device 101 and the gateway device 102 are connected by a wired or wireless network.

The gateway device 102 is a computer system or device that provides a data conversion service between multiple networks. In the IoT system, the gateway device 102 is configured to receive device data uploaded by multiple IoT devices, and convert the device data into a predetermined format, such that the device data is uploaded to the server 103.

In the embodiment of the present disclosure, a first MQTT channel and a second MQTT channel are disposed between the gateway device 102 and the server 103; when the connection between the gateway device 102 and the server 103 is interrupted, the gateway device 102 divides the device data reported by the IoT device into historical data and real-time data; when the connection is resumed, the real-time data is uploaded to the server 103 over the first MQTT channel, and the historical data is uploaded over the second MQTT channel; and when uploading the device data over the first MQTT channel and the second MQTT channel, the gateway device 102 controls the consumption rate of the historical data, such that the historical data is uploaded complementally under the precondition of ensuring that real-time data transmission is not affected.

The server 103 is the cloud in the IoT system, and is configured to receive device data from the gateway device 102, and store, process, and analyze the device data, thereby performing service discovery and providing a service query function, to implement IoT application service logic.

Optionally, the IoT system further includes a monitoring device connected to the server 103, and configured to send a data query request to the server 103, and the server 103 queries the stored device data according to the data query request, and feeds back to the monitoring device for displaying the queried device data, to help the staff to monitor the working status of each IoT device 101.

Figure 2:
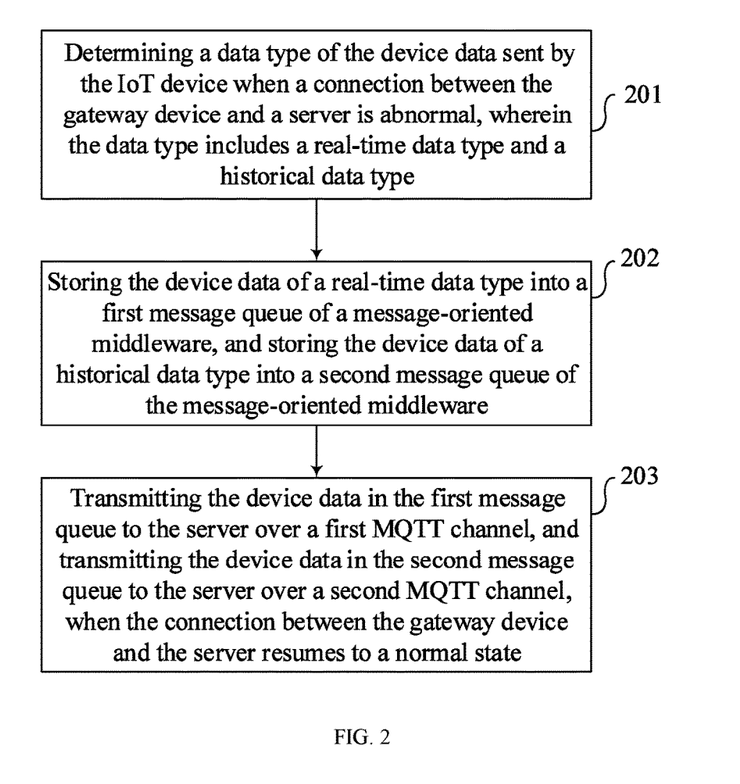
FIG. 2 is a flowchart of a method for transmitting data in an IoT system according to an exemplary embodiment.

Referring to FIG. 2, a flowchart of a method for transmitting data in an IoT system according to an exemplary embodiment of the present disclosure is illustrated. This embodiment is illustrated by taking the method used in a gateway device as an example. The method includes the following steps.

Step 201: When a connection between the gateway device and a server is abnormal, a data type of the device data sent by the IoT device is determined, wherein the data type includes a real-time data type and a historical data type.

In the IoT system, the gateway device receives the device data from the IoT device and sends the data to the cloud server to implement data statistics and discover business value. However, due to network jitter, device failure, etc., a connection abnormality may occur in the data transmission channel between the gateway device and the cloud server, resulting in interruption of data transmission.

In a possible implementation, the gateway device divides the device data sent by the IoT device into real-time data and historical data according to a preset judgment mechanism. When the connection between the gateway device and the server is abnormal, the data type of the current data to be transmitted is firstly determined, so as to perform the corresponding processing on different types of data subsequently.

Step 202: The device data of a real-time data type is stored into a first message queue of a message-oriented middleware, and the device data of a historical data type is stored into a second message queue of the message-oriented middleware.

The message-oriented middleware is communication software based on message transfer that provides various end-to-end data communication services in a distributed network, including various functions of real-time data transmission, reliable queues, event services and the like. After determining the data type of the data to be transmitted, the gateway device stores the data in the corresponding message queue of the message-oriented middleware according to the data type.

Figure 3:
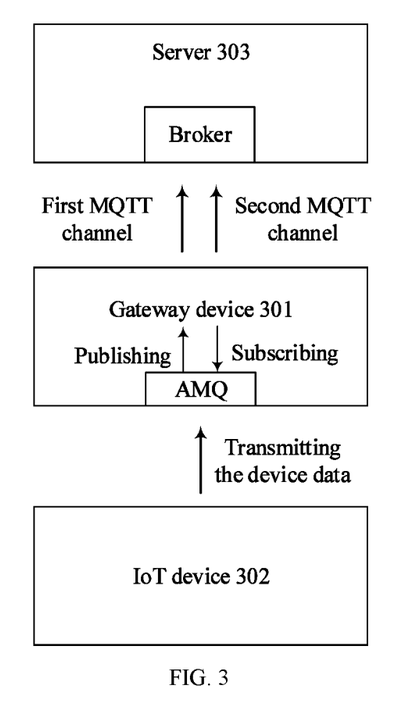
FIG. 3 is a schematic diagram of a data transmission process in an IoT system according to an exemplary embodiment.

Schematically, referring to FIG. 3, the IoT system adopts an active message queue (AMQ) and selects a publish/subscribe mode, that is, the gateway device 301 may only obtain the message queue after subscription and send it to the server 303. There is a server-side implementation of the Message Queuing Telemetry Transport (MQTT) protocol, i.e., an MQTT Broker, running in the server 303. The AMQ needs to be connected to the MQTT Broker before implementing the publish/subscribe function. The gateway device 301 receives the device data from the IoT device 302 and sends the device data to the server 303. When the connection between the gateway device 301 and the server 303 is abnormal, the current device data to be transmitted is published to the message queue of AMQ; when the connection resumes to a normal state, the gateway device 301 subscribes to the device data in the message queue of AMQ and sends the device data to the server 303 from the corresponding data channel.

Step 203: The device data in the first message queue is transmitted to the server over a first MQTT channel, and the device data in the second message queue is transmitted to the server over a second MQTT channel, when the connection between the gateway device and the server resumes to a normal state.

In a possible implementation, two MQTT channels are disposed between the gateway device and the server. When the data transmission status between the gateway device and the server is normal, the gateway device sends the device data in the first message queue to the server over the first MQTT channel. For the historical data stored in the second message queue, the gateway device first detects whether the second MQTT channel has been established, and if the second MQTT channel has been established, sends the device data in the second message queue to the server over the second MQTT channel, and if the second MQTT channel has not been established, initializes the connection of the second MQTT channel, and then sends the device data in the second message queue to the server over the second MQTT channel. The second MQTT channel is a channel for uploading only historical data, and the data is transmitted in an encrypted manner in the channel, which reduces the risk of leaking or being stolen.

In summary, in the embodiment of the present disclosure, when the connection between the gateway device and the server is abnormal, the data to be transmitted is divided into real-time data and historical data, and stored in different message queues respectively, such that the device data in the message queues is uploaded to the server over different channels when the connection resumes to the normal state, which improves the timeliness of uploading real-time data while ensuring data integrity, and does not require manual intervention to upload breakpoint data complementarily, thereby simplifying the operation steps.

Figure 4:
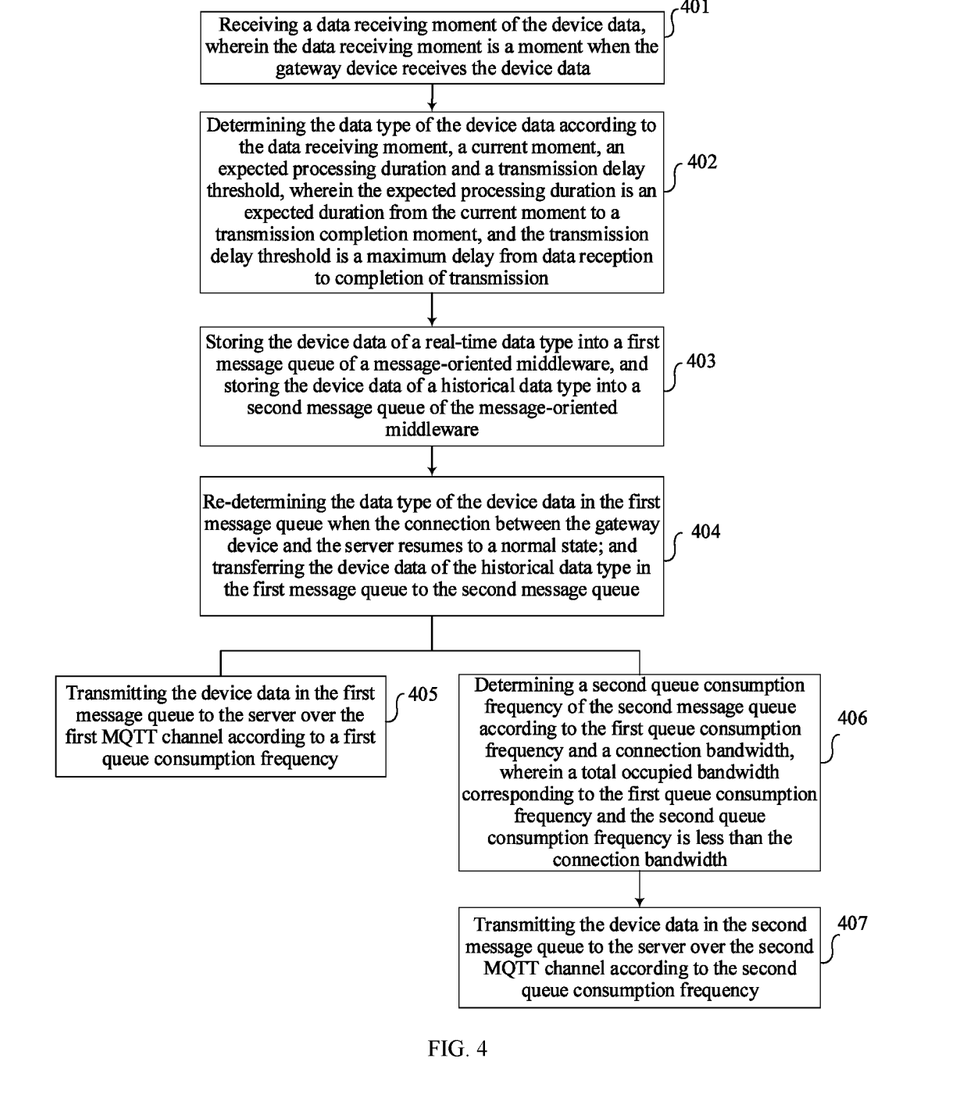
FIG. 4 is a flowchart of a method for transmitting data in an IoT system according to another exemplary embodiment.

Referring to FIG. 4, a flowchart of a method for transmitting data in an IoT system according to another exemplary embodiment of the present disclosure is illustrated. This embodiment is illustrated by taking the method used in a gateway device as an example. The method includes the following steps.

Step 401: A data receiving moment of the device data is received, wherein the data receiving moment is a moment when the gateway device receives the device data.

In a possible implementation, when acquiring the device data acquired by the IoT device, the gateway device converts the device data into a data structure of a predetermined format, wherein the data structure includes a field for storing a data receiving moment. Before uploading the device data, the gateway device first reads the data receiving time of the device data from the field.

Step 402: The data type of the device data is determined according to the data receiving moment, a current moment, a expected processing duration and a transmission delay threshold, wherein the expected processing duration is an expected duration from the current moment to a transmission completion moment, and the transmission delay threshold is a maximum delay from data reception to completion of transmission.

The expected processing duration is determined and obtained by the gateway device based on the factors such as the IoT device's device data type, the data volume, the network bandwidth, and is a duration desired for the device data from the current moment to the transmission success moment. The transmission delay threshold is obtained by the gateway device based on the device data type and the historical transmission record, and is the maximum delay allowed from data reception to completion of transmission. When receiving the device data of the IoT device, the gateway device acquires the data receiving time of the device data, and obtains the corresponding expected processing duration and the transmission delay threshold, and determines the data type of the device data on the basis of the current moment.

In a possible implementation, the process may include the following steps:

1. An expected transmission duration of the device data is determined according to the data receiving moment, the current moment, and the expected processing duration.

Alternatively, the expected processing duration is preset and determined by the gateway device based on factors such as a current network condition, a data transmission speed of the first MQTT channel, and a volume of the device data in the data transmission queue, that is, an expected duration from the current moment to the transmission completion moment. The gateway device determines the expected transmission duration of the device data according to the data receiving moment, the current moment, and the expected processing duration. In a possible implementation, the expected transmission duration of the device data is equal to the current moment minus the data receiving time plus the expected processing duration.

Schematically, if the current moment is 10:00:10, for device data with a data receiving moment of 10:00:08 and an expected processing duration of 1 second, the expected transmission duration thereof is 3 seconds.

2. If the expected transmission duration is greater than the transmission delay threshold, it is determined that the device data is of a historical data type.

The gateway device compares the expected transmission duration of the device data with the transmission delay threshold, and divides the data type of the device data into a historical data type and a real-time data type according to the comparison result, and if the expected transmission duration is greater than the transmission delay threshold, the device data is of a historical data type.

Schematically, the gateway device presets a transmission delay threshold of 2 seconds, if the current moment is 10:00:10, for device data with a data receiving moment of 10:00:08 and an expected processing duration of 1 second, the expected transmission duration thereof is 3 seconds, which is greater than the transmission delay threshold, and the gateway device determines that the device data is of a historical data type.

3. If the expected transmission duration is less than the transmission delay threshold, it is determined that the device data is of a real-time data type.

If the expected transmission duration of the device data is less than the transmission delay threshold, the expected transmission duration of the device data is within the range of real-time data, i.e., the data is of a real-time data type.

Schematically, the gateway device presets a transmission delay threshold of 2 seconds, if the current moment is 10:00:10, for the device data with a data receiving moment of 10:00:10 and an expected processing duration of 1 second, the expected transmission duration thereof is 1 second, which is less than the transmission delay threshold, and the gateway device determines that the device data is of a real-time data type.

In a possible implementation, one gateway device receives data acquired by multiple IoT devices and uploads the data to the server. Since the acquisition devices are different, the data structure, the data volume, and network resources consumed during transmission, etc. of their device data are also different. Therefore, prior to the step 402, the gateway device determines the expected processing duration and the transmission delay threshold corresponding to the device data according to a data processing difficulty and a preset corresponding relationship of the device data, and correspondingly, the gateway device subsequently determines that the device data belongs to real-time data or historical data according to the expected processing duration and the transmission delay threshold corresponding to the device data, and the preset corresponding relationship includes a corresponding relationship between the data processing difficulty, the expected processing duration, and the transmission delay threshold.

Schematically, for an acquisition device with a large amount of acquired data, a complex data structure and a long transmission time, the gateway device sets the expected processing duration of its device data to be T1, and the transmission delay threshold to be T2; for an acquisition device with a small amount of acquired data or a short transmission time, the gateway device sets he expected processing duration of its device data to be T3, and the transmission delay threshold to be T4. The data processing difficulty of the latter is less than that of the former, and T2 is greater than T4.

Step 403: The device data of a real-time data type is stored into a first message queue of a message-oriented middleware, and the device data of a historical data type is stored into a second message queue of the message-oriented middleware.

For the implementation of step 403, reference may be made to step 202, which is not described in the present embodiment again.

Step 404: The data type of the device data in the first message queue is re-determined when the connection between the gateway device and the server resumes to a normal state; and the device data of the historical data type in the first message queue is transferred to the second message queue.

Since it takes a period of time for the connection between the gateway device and the server to resume to a normal state, the real-time data before the abnormal connection may be converted into historical data. Therefore, when the connection between the gateway device and the server resumes to the normal state, the data type of the device data in the first message queue is re-determined; and if there is historical data, the device data of a historical data type is transferred to the second message queue.

Figure 5:
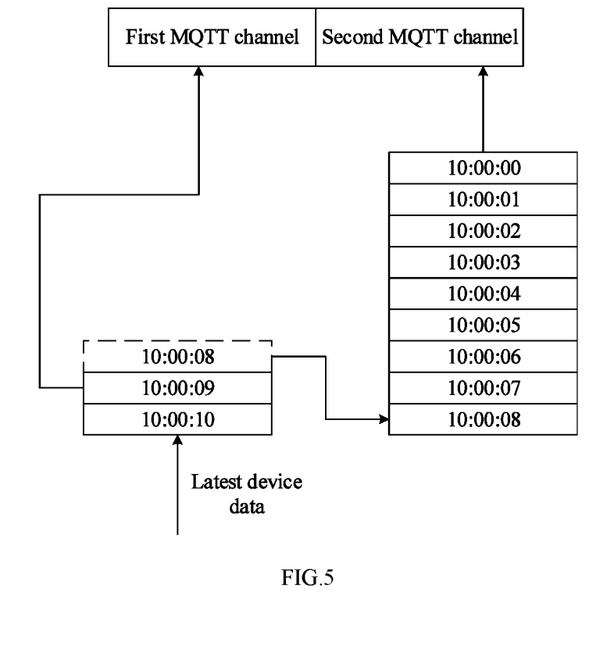
FIG. 5 is a schematic diagram of a data transmission process according to another exemplary embodiment.

Schematically, as shown in FIG. 5, the gateway device presets a transmission delay threshold of 2 seconds, and if the moment when the transmission channel connection is abnormal is 10:00:08, and the moment when the connection resumes to the normal state is 10:00:10, for device data with a data receiving moment of 10:00:08 and an expected processing duration of 1 second, the expected transmission duration thereof is 1 second when the connection is abnormal, the device data is of a real-time data type, and the expected transmission time is 3 seconds when the connection resumes to the normal state, which is greater than the transmission delay threshold and the device data is of a historical data type, and then the gateway device transfers the device data to the second message queue.

In another possible implementation, step 404 may be further substituted by: re-determining the data type of the device data in the first message queue every predetermined time interval, and transferring the device data of the historical data type in the first message queue to the second message queue.

When the connection between the gateway device and the server is abnormal, the gateway device may still determine the data type of the device data, in order that the device data of the first message queue may be quickly uploaded from the corresponding channel when the connection resumes to the normal state, the gateway device re-determines the data type of the device data in the first message queue every predetermined time interval and transfers the device data of the historical data type in the first message queue to the second message queue.

Step 405: The device data in the first message queue is transmitted to the server over the first MQTT channel according to a first queue consumption frequency.

After the first MQTT channel connection resumes to the normal state, the gateway device sends the device data of the first message queue in the message-oriented middleware to the server over the first MQTT channel according to the consumption frequency of the real-time data in the first queue.

In a possible implementation, one gateway device is connected to multiple IoT devices, and the received device data has multiple types, so the first queue consumption frequency of the first message queue may change at every moment, for example, when the device data acquired by the IoT device A is transmitted in a centralized manner, the first queue consumption frequency is 1800 per hour, and when the device data acquired by the IoT device B is transmitted in a centralized manner, the data volume is small, and the first queue consumption frequency is 1000 per hour.

Step 406: A second queue consumption frequency of the second message queue is determined according to the first queue consumption frequency and a connection bandwidth, wherein a total occupied bandwidth corresponding to the first queue consumption frequency and the second queue consumption frequency is less than the connection bandwidth.

The first MQTT channel and the second MQTT channel transmit device data in the same network environment, and the total occupied bandwidth is prioritized, so the transmission of historical data may affect the transmission speed of the real-time data. In order to ensure that the real-time data is preferentially transmitted to the server according to the normal speed, the gateway device determines the second queue consumption frequency of the second message queue according to the first queue consumption frequency and the connection bandwidth.

In a possible implementation, the user may preset a relationship of the second queue consumption frequency with the first queue consumption frequency and the connection bandwidth, such that the second queue consumption frequency may be dynamically adjusted as the first queue consumption frequency changes.

Schematically, within the current time period, the highest message queue consumption frequency allowed by the connection bandwidth is 2000 per hour. When the device data acquired by the IoT device A is transmitted in a centralized manner, the first queue consumption frequency is 1800 per hour, and then the gateway device adjusts the second queue consumption frequency to not exceed 200 per hour; when the device data acquired by the IoT device B is transmitted in a centralized manner, the data volume is small, and the first queue consumption frequency is 1000 per hour, and then the gateway device adjusts the second queue consumption frequency to not exceed 1000 per hour.

Step 407: The device data in the second message queue is transmitted to the server over the second MQTT channel according to the second queue consumption frequency.

After determining the current second queue consumption frequency according to the first queue consumption frequency and the connection bandwidth, the gateway device sends the historical data in the second message queue to the server over the second MQTT channel according to the second queue consumption frequency, thereby ensuring that the real-time data may be uploaded preferentially.

In the embodiment of the present disclosure, for the device data of different IoT devices, the historical data and the real-time data are divided according to actual needs, and the second queue consumption frequency is determined according to the first queue consumption frequency of the real-time data; under the condition that the real-time data is transmitted preferentially, the historical data is sent to the server over the second MQTT channel, which improves the data processing and transmission efficiency under the premise of ensuring the integrity and timeliness of the data.

Figure 6:
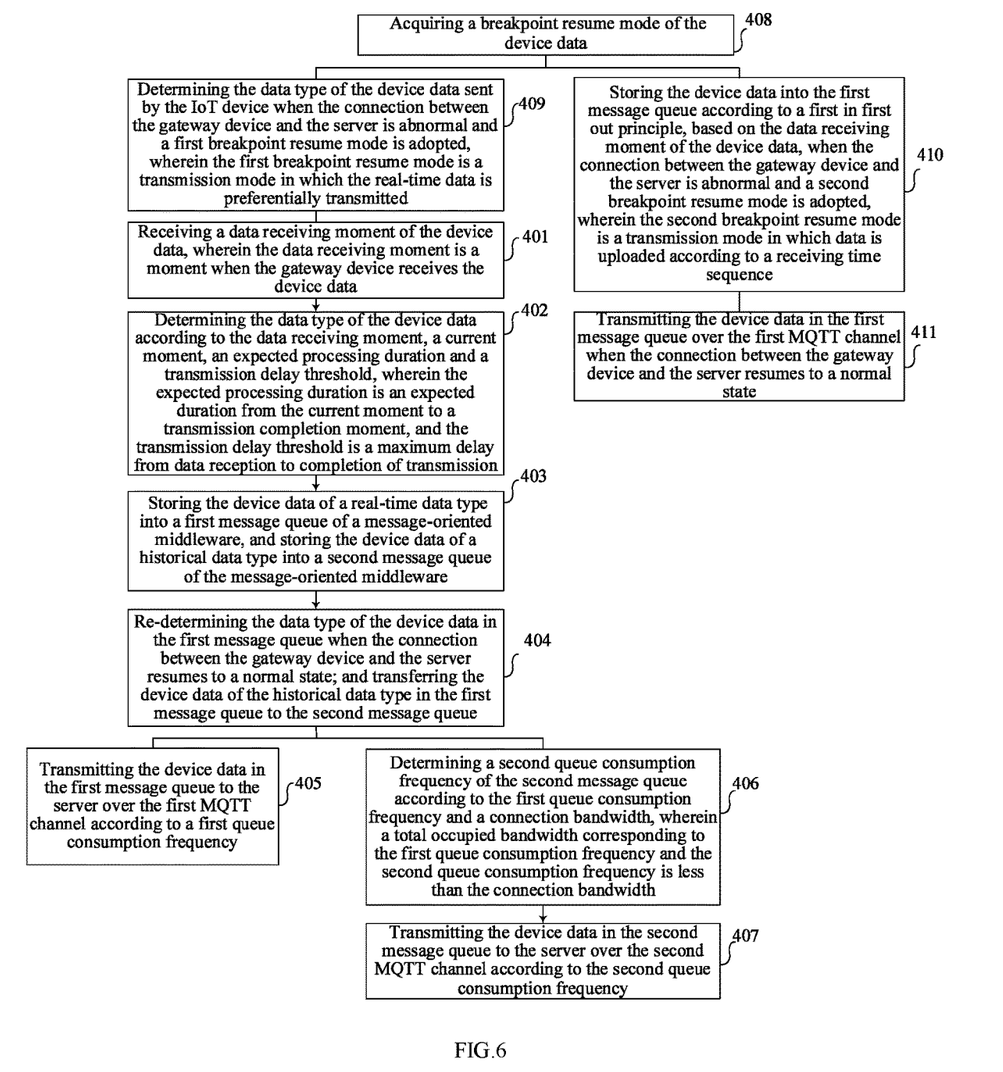
FIG. 6 is a flowchart of a method for transmitting data in an IoT system according to another exemplary embodiment.

In the above embodiment, the device data is transmitted in a transmission mode in which the real-time data is preferentially transmitted, that is, the historical data is uploaded under the premise of ensuring preferential transmission of the real-time data, and for some data requiring stricter acquisition time sequence, the breakpoint resume mode may cause that the time sequence of the device data acquired by the server is disordered. Therefore, referring to FIG. 6, in a possible implementation, before step 401, the following steps are also included:

Step 408: A breakpoint resume mode of the device data is acquired.

In a possible implementation, for different IoT devices, the user may set different breakpoint resume modes according to actual needs, and the gateway device first acquires the breakpoint resume mode of the device data before transmitting the device data.

Step 409: The data type of the device data sent by the IoT device is determined when the connection between the gateway device and the server is abnormal and a first breakpoint resume mode is adopted, wherein the first breakpoint resume mode is a transmission mode in which the real-time data is preferentially transmitted.

The gateway device adopts a corresponding transmission mode based on the breakpoint resume mode of the device data. When the connection between the gateway device and the server is normal, the device data is sent to the server over the first MQTT channel; when the connection between the gateway device and the server is abnormal, if the current device data adopts the first breakpoint resume mode, its data type is determined, and steps 401 to 407 are performed.

Step 410: The device data is stored into the first message queue according to a first in first out principle, based on the data receiving moment of the device data, when the connection between the gateway device and the server is abnormal and a second breakpoint resume mode is adopted, wherein the second breakpoint resume mode is a transmission mode in which data is uploaded according to a receiving time sequence.

When the connection between the gateway device and the server is abnormal, for some device data requiring strict time sequence, the gateway device adopts the second breakpoint resume mode for transmission, that is, according to the data receiving moment of the device data, the device data is stored in the first message queue of AMQ strictly in a sequential order.

Step 411: The device data in the first message queue is transmitted over the first MQTT channel when the connection between the gateway device and the server resumes to a normal state.

When the connection between the gateway device and the server resumes to the normal state, the device data in the first message queue is first sent to the server over the first MQTT channel, and the data received during this period is waiting in line in the transmission queue. When the device data in the first-in first-out mode in the first message queue is all transmitted successfully, the remaining device data is continuously transmitted.

It should be noted that, no strict sequence is defined between step 409 and steps 410 to 411, that is, step 409 and steps 410 to 411 may be performed simultaneously, which is not limited in this embodiment.

In the embodiment of the present disclosure, the user may set different breakpoint resume modes according to the actual requirements of different device data; for the device data that requires strict data integrity without considering the data acquisition time sequence, a breakpoint resume mode in which the real-time data is preferred may be adopted; for the device data that requires strict data acquisition time sequence, the first-in first-out breakpoint resume mode may be adopted, which meets the user requirements and improves the timeliness of transmitting data by the gateway device.

Figure 7:
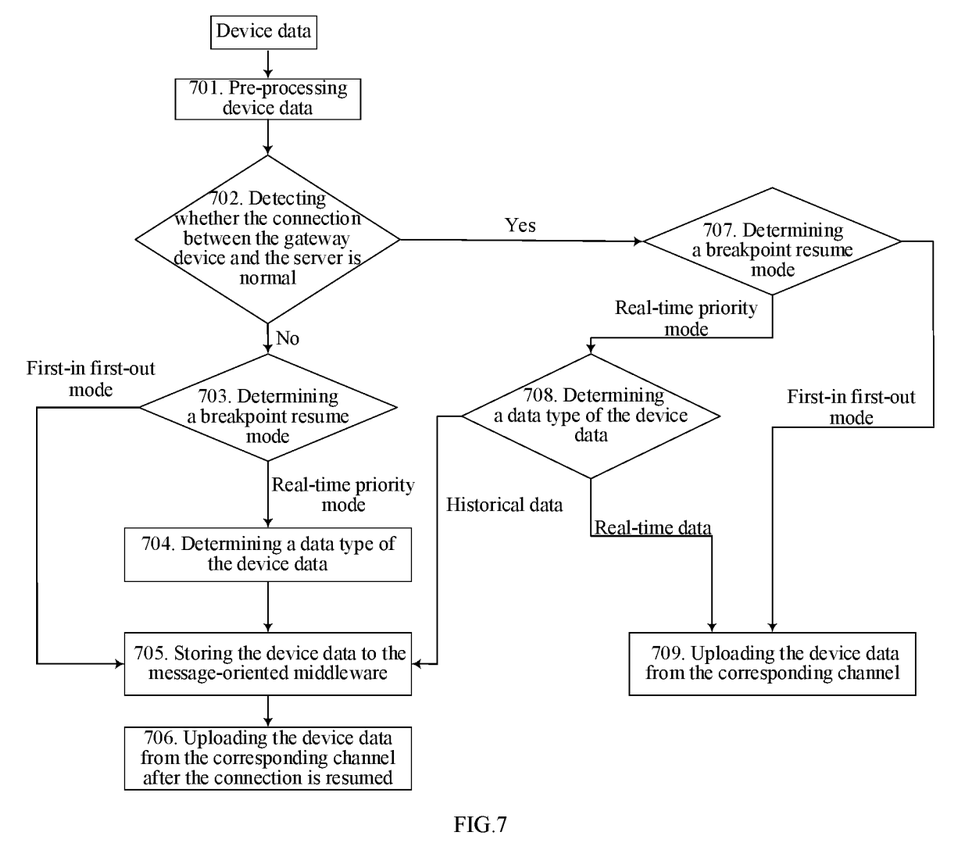
FIG. 7 is a flowchart of a method for transmitting data in an IoT system according to another exemplary embodiment.

In combination with the above embodiment, in a schematic example, the flow of data transmission in the IoT system is as shown in FIG. 7.

Step 701: Device data is pre-processed.

When receiving the device data acquired by the IoT device, the gateway device first converts the structure of the device data into a data structure that the computer device may process.

Step 702: Whether the connection between the gateway device and the server is normal is detected.

If the connection is abnormal, step 703 is performed; if the connection is normal, step 708 is performed, and the gateway device needs to adopt a corresponding data transmission mode according to the current connection state.

Step 703: A breakpoint resume mode is determined.

If the breakpoint resume mode is the first-in first-out mode, step 705 is performed; if the breakpoint resume mode is the real-time priority mode, step 704 is performed, and then step 705 is performed. For different IoT devices, the user may set different breakpoint resume modes according to actual needs. Before transmitting the device data, the gateway device first obtains the breakpoint resume mode of the device data.

Step 704: A data type of the device data is determined.

If the breakpoint resume mode is a real-time priority mode, the gateway device needs to determine whether the device data belongs to real-time data or historical data, and adopts a corresponding transmission mode according to the data type.

Step 705: The device data is stored to the message-oriented middleware.

The gateway device stores the device data in the corresponding message queue of the message-oriented middleware according to the data type of the device data, stores the device data in the first-in first-out mode and the device data of the real-time data type in the breakpoint resume mode to the first message queue of the message-oriented middleware, and stores the device data of the historical data type to the second message queue of the message-oriented middleware.

Step 706: The device data is uploaded from the corresponding channel after the connection is resumed.

After the connection between the gateway device and the server resumes to a normal state, for the device data in the first-in first-out mode in the first message queue, it is preferentially transmitted over the first MQTT channel, and then the subsequently acquired device data is transmitted; for the device data in the real-time priority mode, the data type is re-determined, the historical data is sent from the second MQTT channel, and the real-time data is sent from the first MQTT channel.

Step 707: A breakpoint resume mode is determined.

When the connection between the gateway device and the server is normal, the gateway device also needs to acquire a breakpoint resume mode of the device data. If the breakpoint resume mode is the real-time priority mode, step 709 is performed after step 708 is performed; if the breakpoint resume mode is the first-in first-out mode, step 709 is performed.

Step 708: A data type of the device data is determined.

If the breakpoint resume mode is the real-time priority mode, it is determined whether the device data belongs to real-time data or historical data. If the data type is historical data, step 705 is performed; and if the data type is real-time data, step 709 is performed.

Step 709: The device data is uploaded from the corresponding channel.

For the device data in the first-in first-out mode, the device data in the first message queue is preferentially transmitted, and then the device data acquired subsequently is transmitted. For the device data in the real-time priority mode, the historical data is sent from the second MQTT channel, and the real-time data is sent from the first MQTT channel.

Figure 8:
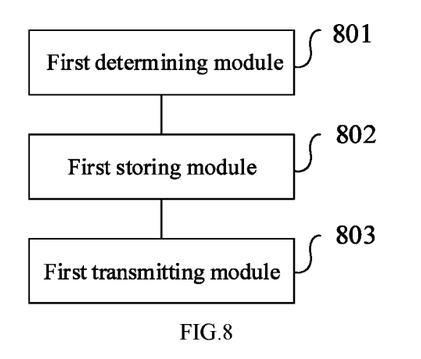
FIG. 8 is a structural block diagram of an apparatus for transmitting data in an IoT system according to an exemplary embodiment.

FIG. 8 is a structural block diagram of an apparatus for transmitting data in an IoT system according to an exemplary embodiment of the present disclosure. The apparatus may be configured in the gateway device described in the above embodiment. As shown in FIG. 8, the apparatus includes:

a first determining module 801, configured to determine a data type of the device data sent by the IoT device when a connection between the gateway device and a server is abnormal, the data type including a real-time data type and a historical data type;

a first storing module 802, configured to store the device data of a real-time data type to a first message queue of a message-oriented middleware, and the device data of a historical data type to a second message queue of the message-oriented middleware; and a first transmitting module 803, configured to transmit the device data in the first message queue to the server over a first MQTT channel, and transmit the device data in the second message queue to the server over a second MQTT channel, when the connection between the gateway device and the server resumes to a normal state.

Optionally, the first determining module 801 includes:

an acquiring unit, configured to acquire a data receiving moment of the device data, wherein the data receiving moment is a moment when the gateway device receives the device data; and a first determining unit, configured to determine the data type of the device data according to the data receiving moment, a current moment, an expected processing duration and a transmission delay threshold, the expected processing duration being an expected duration from the current moment to a transmission completion moment, and the transmission delay threshold being the maximum delay from data reception to completion of transmission.

Optionally, the first determining unit is further configured to:

determine an expected transmission duration of the device data according to the data receiving moment, the current moment, and the expected processing duration;

determine that the device data is of the historical data type if the expected transmission duration is greater than the transmission delay threshold; and determine that the device data is of the real-time data type if the expected transmission duration is less than the transmission delay threshold.

Optionally, the first determining module 801 further includes:

a second determining unit, configured to determine the expected processing duration and the transmission delay threshold corresponding to the device data according to a data processing difficulty of the device data and a preset corresponding relationship, the preset corresponding relationship including a corresponding relationship between the data processing difficulty, the expected processing duration and the transmission delay threshold.

Optionally, the first transmitting module 803 includes:

a first transmitting unit, configured to transmit the device data in the first message queue to the server over the first MQTT channel according to a first queue consumption frequency;

a third determining unit, configured to determine a second queue consumption frequency of the second message queue according to the first queue consumption frequency and a connection bandwidth, wherein a total occupied bandwidth corresponding to the first queue consumption frequency and the second queue consumption frequency is less than the connection bandwidth; and a second transmitting unit, configured to transmit the device data in the second message queue to the server over the second MQTT channel according to the second queue consumption frequency.

Optionally, the apparatus further includes:

a second determining module, configured to re-determine the data type of the device data in the first message queue when the connection between the gateway device and the server resumes to a normal state, and transfer the device data of the historical data type in the first message queue to the second message queue; or a third determining module, configured to re-determine the data type of the device data in the first message queue every predetermined time interval; transfer the device data of the historical data type in the first message queue to the second message queue.

Optionally, the first determining module 801 further includes:

a fourth determining unit, configured to determine the data type of the device data sent by the IoT device when the connection between the gateway device and the server is abnormal and a first breakpoint resume mode is adopted, the first breakpoint resume mode being a transmission mode in which the real-time data is preferentially transmitted.

The apparatus further includes:

a second storing module, configured to store the device data into the first message queue according to a first-in first-out principle, based on the data receiving moment of the device data, when the connection between the gateway device and the server is abnormal and a second breakpoint resume mode is adopted, the second breakpoint resume mode being a transmission mode in which data is uploaded according to a receiving time sequence; and a second transmitting module, configured to transmit the device data in the first message queue over the first MQTT channel when the connection between the gateway device and the server resumes to the normal state.

Figure 9:
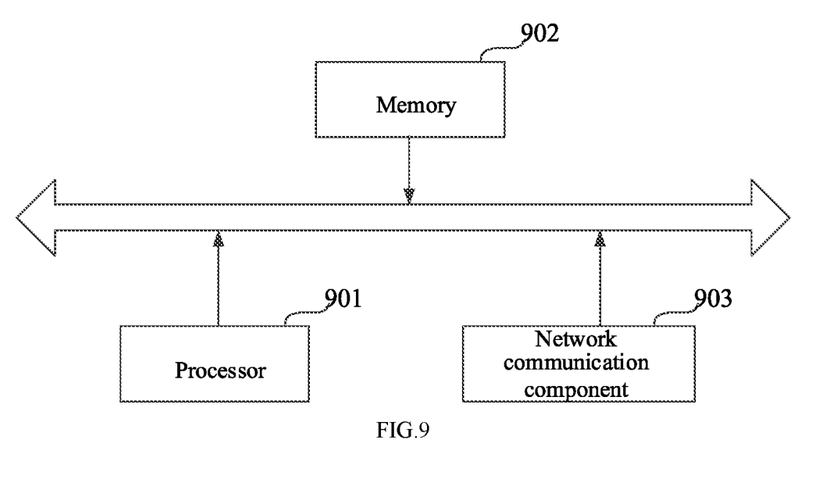
FIG. 9 is a schematic structural diagram of a gateway device according to an exemplary embodiment.

Referring to FIG. 9, a structural block diagram of a gateway device according to an exemplary embodiment of the present disclosure is illustrated. The gateway device in this disclosure may include one or more of the following components: a processor 901, a memory 902, and a network communication component 903.

The processor 901 may include one or more processing cores. The processor 901 connects various portions within the entire terminal 901 using various interfaces and lines, and executes various functions of the gateway device and processes data by running or executing an instruction, program, code set or instruction set stored in the memory 902, and invoking data stored in the memory 902. Alternatively, the processor 901 may be implemented by using at least one of hardware forms of a digital signal processing (DSP), a field-programmable gate array (FPGA), and a programmable logic array (PLA). The processor 901 may integrate one or a combination of two of a central processing unit (CPU), a modem, and the like. The CPU mainly processes operating systems and applications, etc.; the modem is used to process wireless communication. It can be understood that the above modem may also not be integrated into the processor 901 and is implemented by a single communication chip.

The memory 902 may include a random access memory (RAM), and may also include a read-only memory (ROM). Alternatively, the memory 902 includes a non-transitory computer-readable storage medium. The memory 902 may be used to store instructions, programs, codes, a code set, or an instruction set. The memory 902 may include a memory program area and a memory data area, wherein the memory program area may store an instruction for implementing an operating system, an instruction for implementing at least one function, instructions for implementing the various method embodiments described above, and the like. The storage data area may also store data created by the gateway device in use, and the like.

The network communication component 903 is used for wired or wireless communication between the gateway device and other devices. The gateway device may access a wireless network based on a communication standard such as Wi-Fi, or 2G, or 3G, or 1G, or 5G or a combination thereof. In an exemplary embodiment, the network communication component 903 receives broadcast signals or broadcast related information from an external broadcast management system over a broadcast channel. In an exemplary embodiment, the network communication component 903 also includes a near field communication (NFC) module to facilitate short range communication.

An embodiment of the present disclosure further provides a computer-readable storage medium storing at least one instruction loaded and executed by the processor to implement the method for transmitting data in the IoT system as described in the foregoing embodiments.

An embodiment of the present disclosure further provides a computer program product storing at least one instruction loaded and executed by the processor to implement the method for transmitting data in the IoT system as described in the foregoing embodiments.

It should be appreciated by those skilled in the art that in one or more of the above examples, the functions described in the embodiments of the present disclosure may be implemented in hardware, software, firmware or any combination thereof. When being implemented in the software, these functions may be stored in a computer-readable storage medium or transmitted as one or more instructions or codes on the computer-readable storage medium. The computer-readable storage medium includes a computer storage medium and a communication medium, wherein the communication medium includes any medium that facilitates the transmission of a computer program from one place to another. The storage medium may be any available medium accessible by a general computer or dedicated computer.

Described above are merely exemplary embodiments of the present disclosure, and are not intended to limit the present disclosure. Within the spirit and principles of the disclosure, any modifications, equivalent substitutions, improvements, or the like are within the protection scope of the present disclosure.

What is claimed is:

1. A method for transmitting data in an Internet of things (IoT) system, wherein the method is applied to a gateway device configured to transmit device data sent by an IoT device to a server, and the method comprises:
   determining a data type of the device data sent by the IoT device when a connection between the gateway device and the server is abnormal, the data type comprising a real-time data type and a historical data type;
   storing the device data of the real-time data type into a first message queue of a message-oriented middleware, and storing the device data of the historical data type into a second message queue of the message-oriented middleware;
   transmitting the device data in the first message queue to the server over a first Message Queuing Telemetry Transport (MQTT) channel, and transmitting the device data in the second message queue to the server over a second MQTT channel.

2. The method according to claim 1, wherein determining the data type of the device data sent by the IoT device comprises:
   acquiring a data receiving moment of the device data, the data receiving moment being a moment when the gateway device receives the device data from the IoT device;
   determining the data type of the device data according to the data receiving moment of the device data, a current moment, an expected processing duration and a transmission delay threshold, the expected processing duration being an expected duration from the current moment to a transmission completion moment of the device data, and the transmission delay threshold being a predetermined delay from the data receiving moment to the transmission complete moment.

3. The method according to claim 2, wherein determining the data type of the device data according to the data receiving moment, the current moment, the expected processing duration and the transmission delay threshold comprises:

determining an expected transmission duration of the device data according to the data receiving moment, the current moment, and the expected processing duration;

determining that the device data is of the historical data type if the expected transmission duration is greater than the transmission delay threshold; and determining that the device data is of the real-time data type if the expected transmission duration is less than the transmission delay threshold.

4. The method according to claim 2, wherein prior to determining the data type of the device data according to the data receiving moment, the current moment, the expected processing duration and the transmission delay threshold, the method further comprises:

determining the expected processing duration and the transmission delay threshold corresponding to the device data according to a data processing difficulty of the device data and a preset corresponding relationship, the preset corresponding relationship comprising a corresponding relationship between the data processing difficulty, the expected processing duration and the transmission delay threshold.

5. The method according to claim 2, wherein determining the data type of the device data sent by the IoT device when the connection between the gateway device and the server is abnormal comprises:

determining the data type of the device data sent by the IoT device when the connection between the gateway device and the server is abnormal and a first breakpoint resume mode is adopted, the first breakpoint resume mode being a first transmission mode in which the device data of the real-time type is preferentially transmitted; and the method further comprises:

storing the device data of the real-time type into the first message queue according to a first in first out principle, based on the data receiving moment of the device data, when the connection between the gateway device and the server is abnormal and a second breakpoint resume mode is adopted, the second breakpoint resume mode being a second transmission mode in which the device data is uploaded according to a receiving time sequence; and transmitting the device data of the real-time type in the first message queue over the first MQTT channel when the connection between the gateway device and the server resumes to a normal state.

6. The method according to claim 1, wherein transmitting the device data in the first message queue to the server over the first MQTT channel, and transmitting the device data in the second message queue to the server over the second MQTT channel comprises:

transmitting the device data in the first message queue to the server over the first MQTT channel according to a first queue consumption frequency;

determining a second queue consumption frequency of the second message queue according to the first queue consumption frequency and a connection bandwidth, wherein a total occupied bandwidth corresponding to the first queue consumption frequency and the second queue consumption frequency is less than the connection bandwidth; and transmitting the device data in the second message queue to the server over the second MQTT channel according to the second queue consumption frequency.

7. The method according to claim 1, wherein prior to transmitting the device data in the first message queue to the server over the first MQTT channel, and transmitting the device data in the second message queue to the server over the second MQTT channel, the method further comprises:

re-determining the data type of the device data in the first message queue when the connection between the gateway device and the server resumes to a normal state, and transferring the device data of the historical data type in the first message queue to the second message queue; or re-determining the data type of the device data in the first message queue every predetermined time interval; transferring the device data of the historical data type in the first message queue to the second message queue.

8. An apparatus for transmitting data in an Internet of things (IoT) system, wherein the apparatus is applied to a gateway device configured to transmit device data sent by an IoT device to a server, and the apparatus comprises:

a first determining module, configured to determine a data type of the device data sent by the IoT device when a connection between the gateway device and the server is abnormal, the data type comprising a real-time data type and a historical data type;

a first storing module, configured to store the device data of the real-time data type to a first message queue of a message-oriented middleware, and the device data of the historical data type to a second message queue of the message-oriented middleware;

a first transmitting module, configured to transmit the device data in the first message queue to the server over a first Message Queuing Telemetry Transport (MQTT) channel, and transmit the device data in the second message queue to the server over a second MQTT channel, when the connection between the gateway device and the server resumes to a normal state.

9. A gateway device, comprising a processor and a memory, wherein the memory stores at least one instruction, at least one program, a code set, or an instruction set, wherein the at least one instruction, the at least one program, the code set or the instruction set is loaded and executed by the processor to perform a method for transmitting data in an Internet of things (IoT) system, wherein the method is applied to the gateway device configured to transmit device data sent by an IoT device to a server, and the method comprises:

determining a data type of the device data sent by the IoT device when a connection between the gateway device and the server is abnormal, the data type comprising a real-time data type and a historical data type;

storing the device data of the real-time data type into a first message queue of a message-oriented middleware, and storing the device data of the historical data type into a second message queue of the message-oriented middleware;

transmitting the device data in the first message queue to the server over a first Message Queuing Telemetry Transport (MQTT) channel, and transmitting the device data in the second message queue to the server over a second MQTT channel.

10. A non-transitory computer-readable storage medium storing at least one instruction, at least one program, a code set, or an instruction set, wherein the at least one instruction, the at least one program, the code set or the instruction set is loaded and executed by a processor to perform a method for transmitting data in an Internet of things (IoT) system wherein the method is applied to a gateway device configured to transmit device data sent by an IoT device to a server, and the method comprises:

determining a data type of the device data sent by the IoT device when a connection between the gateway device and the server is abnormal, the data type comprising a real-time data type and a historical data type;

storing the device data of the real-time data type into a first message queue of a message-oriented middleware, and storing the device data of the historical data type into a second message queue of the message-oriented middleware;

transmitting the device data in the first message queue to the server over a first Message Queuing Telemetry Transport (MQTT) channel, and transmitting the device data in the second message queue to the server over a second MQTT channel.

* * * * *